(12) United States Patent
Sasaki et al.

(10) Patent No.: US 6,445,809 B1
(45) Date of Patent: Sep. 3, 2002

(54) ENVIRONMENT MONITORING SYSTEM

(75) Inventors: Kazuyuki Sasaki; Naoto Ishikawa, both of Shizuoka; Masato Nakajima, Tokyo; Teruhisa Imai, Kanagawa, all of (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/383,200

(22) Filed: Aug. 26, 1999

(30) Foreign Application Priority Data

Aug. 27, 1998 (JP) .......................................... 10-241264

(51) Int. Cl.$^7$ ................................................ G06K 9/00
(52) U.S. Cl. ........................ 382/104; 340/436; 340/903; 348/118
(58) Field of Search ................................ 382/100, 103, 382/104, 107, 181, 199, 206, 216, 294, 295; 340/435, 461, 903, 941; 348/116, 148; 356/3.14; 701/200

(56) References Cited

U.S. PATENT DOCUMENTS

| | | | | |
|---|---|---|---|---|
| 4,660,037 A | * | 4/1987 | Nakamura | 340/990 |
| 5,221,956 A | * | 6/1993 | Patterson et al. | 356/28 |
| 5,369,590 A | * | 11/1994 | Karasudani | 340/903 |
| 5,410,346 A | * | 4/1995 | Saneyoshi et al. | 348/116 |
| 5,424,952 A | * | 6/1995 | Asayama | 340/903 |
| 5,555,312 A | * | 9/1996 | Shima et al. | 382/104 |
| 5,708,427 A | * | 1/1998 | Bush | 340/941 |

FOREIGN PATENT DOCUMENTS

| | | |
|---|---|---|
| JP | 6-107096 | 4/1994 |
| JP | 7-50769 | 2/1995 |

OTHER PUBLICATIONS

Lorusso et al., "An Approach to Obstacle Detection and Steering Control from Optical Flow", IEEE 1996, Intelligent Vehicle Symposium, pp. 357–362.*

* cited by examiner

Primary Examiner—Jayanti K. Patel
(74) Attorney, Agent, or Firm—Armstrong, Westerman & Hattori, LLP

(57) ABSTRACT

In an environment monitoring system using an optical flow, an optical-flow detecting device detects the optical flow in the steps of reverse-projection converting the early image of two early and later images picked up by an image picked up, on the basis of a predetermined optical arrangement of the image pick-up means onto an x-z plane in parallel to a road surface in a real space to acquire a road surface image; computing a moving distance of one's own vehicle in two timings on the basis of a time interval between two timings and speed information of one's own vehicle; parallel-shifting the road surface image by the moving distance thus computed; projection-converting the road surface image after parallel-shifted to acquire an estimated image of the later image in timing; acquiring a differential image between the later image and its estimated image to extract a feature point; and searching a corresponding point of the feature point extracted. In this configuration, it is possible to prevent an object such as a paint which should not be detected on a road surface from being erroneously detected as another surrounding vehicle.

8 Claims, 11 Drawing Sheets

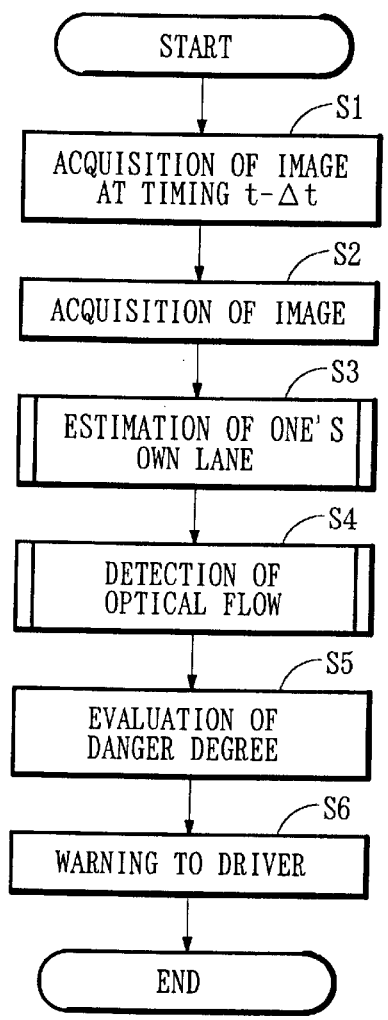
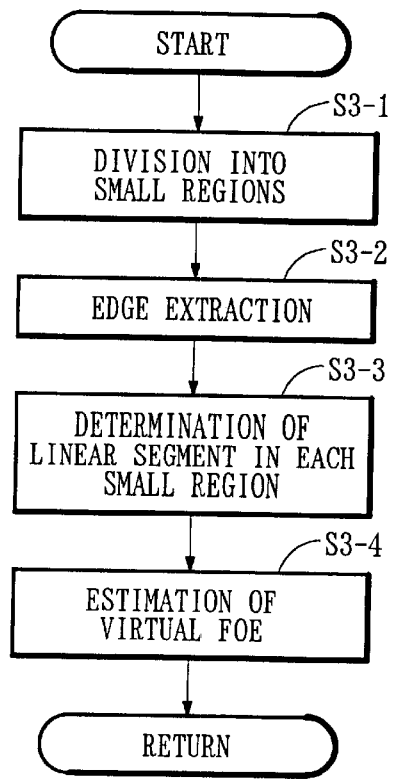
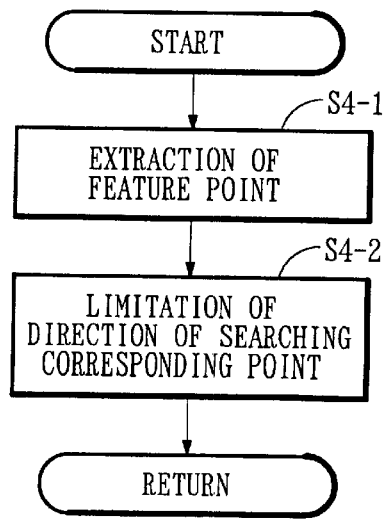

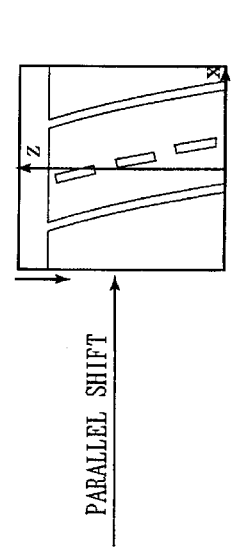
FIG. 14A
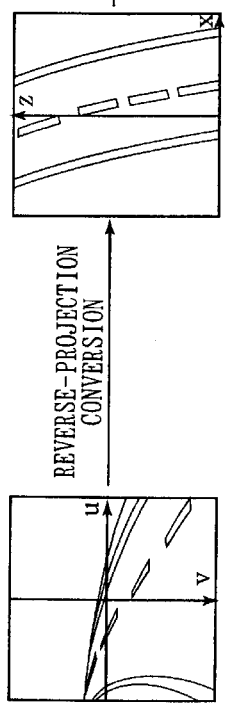
FIG. 14D
FIG. 14G
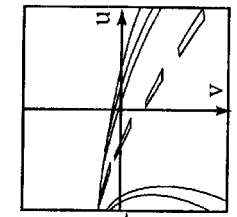
FIG. 14B
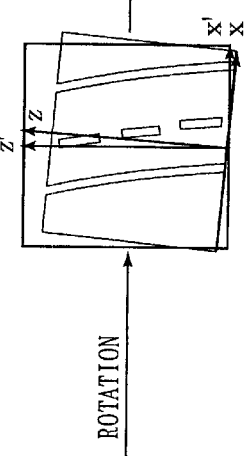
FIG. 14E
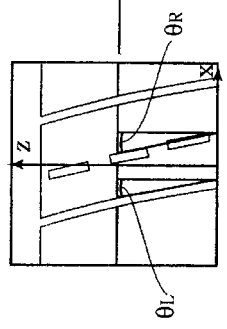
FIG. 14H
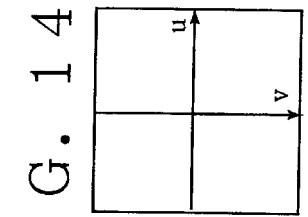
FIG. 14C
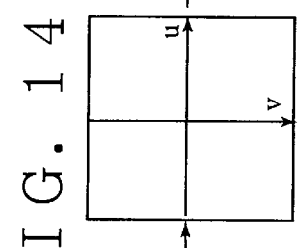
FIG. 14F
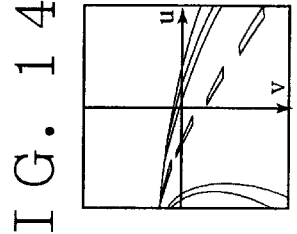
FIG. 14I
REVERSE-PROJECTION CONVERSION
PARALLEL SHIFT
ROTATION
PROJECTION CONVERSION
DIFFERENCE
EDGE EXTRACTION (a)

ENVIRONMENT MONITORING SYSTEM

BACKGROUND OF THE INVENTION

1. Field of the Invention

The present invention relates to an environment monitoring system for picking up the front, rear or diagonal-rear view from one's own vehicle by an image pick-up means such as a video camera installed on the vehicle such as a motor car, detecting another vehicle approaching from the front, rear or diagonal-rear direction of one's own running vehicle using the image picked up and giving a warning to a driver.

2. Description of the Related Art

For example, when a driver of a vehicle running on one-side two lanes of e.g. a speed way intends to change his own vehicle lane, if he changes the lane while he misses another vehicle which catches up with his own vehicle on another lane at a higher speed than his own vehicle from the diagonal-rear direction, there is strong possibility of a serious accident. Therefore, it is desired that the driver surely notices or recognizes other vehicles in the environment.

When another following vehicle on the same lane abruptly approaches his own vehicle from the rear, if the driver of his own vehicle makes abrupt braking, there is possibility of bumping-into-the back.

When another vehicle runs forward on the same lane at a lower speed than that of his own vehicle, if a driver dozes, there is a danger of bumping-into-the back.

Particularly, in recent years, various types of vehicles inclusive of a passenger can have a highly improved performance so that the running speed or acceleration thereof has been greatly increased. Therefore, the vehicle moves very fast in lane changing or acceleration/deceleration. As a result, when the driver misses the presence of another vehicle running in the environment of his own vehicle, there has been increased strong possibility of occurrence of a dangerous state which may lead to serious accidents, or an actual serious accident.

In order to prevent the driver from missing another in the environment than his own vehicle (hereinafter referred to as "surrounding vehicle"), the driver himself must first pay attention to the environment. However, it is true that attention or recognition ability of a human being has reached the limit of ability of capable of following the improved performance of a vehicle. Actually, there is an increased tendency of accidents attributable to the missing the surrounding vehicle at the limit value.

Generally, it is known that the visual recognition ability of a human being abruptly decreases as the running speed increases. The vehicle is still desired to deal with a higher running speed in the future. Therefore, there is a serious problem of danger of missing the presence of the surrounding vehicle in e.g. lane changing.

Accordingly, in order to prevent the danger of a great accident or the actual great accident from occurring, only enhancing the attention of the driver to the presence of the surrounding vehicle is not sufficient. It is necessary to recognize the presence of the surrounding vehicle running in the environment automatically, accurately and surely and give the acquired information to the driver so that the limited recognition ability of a human being can be complemented.

Several techniques for avoiding the danger as described above have been proposed as disclosed in JP-A-6-107096 and JP-A-7-50769. Specifically, JP-A-6-107096 discloses a system for detecting an approaching vehicle and collision warning based on the detection of an optical flow. JP-A-7-50769 discloses a warning system which intends to detect an approaching vehicle from the diagonal-rear direction on the basis of detection of an optical flow and issues a warning when there is a danger of colliding with another vehicle in lane changing.

Now referring to FIGS. 20 and 21, an explanation will be given of the summary of a conventional environment monitoring system.

FIGS. 20A–20D are views for explaining a change in a rear background image acquired by a video camera 1. FIG. 20A shows a status inclusive of one's own vehicle. FIG. 20B shows an image picked up by a video camera 1 at timing t in an environment of one's own vehicle. FIG. 20C shows an image picked up at timing t+Δt.

Now it is assumed that one's own vehicle is running straight on a flat road. The road sign and building residing in the rear of one's own vehicle in FIG. 20A are observed as images shown in FIGS. 20B and 20C at timings t and t+Δt, respectively. Connecting the corresponding points in these two images provides speed vectors as shown in FIG. 20D. The are referred to as "optical flows". Where a following vehicle approaches, the directions of the vectors in the optical flows in FIG. 20D are contrary.

These optical flows appear radially from a point called "FOE" (Focus of Expansion) in the image. The FOE, which refers to "infinite point" or "disappearing point", corresponds to the one point opposite to the running direction of one's own vehicle on the image where one's own vehicle runs straight. In this way, the optical flows acquired when one's own vehicle runs extends radially around the FOE. The optical flows issued from the following vehicle or another vehicle running on an adjacent lane (hereinafter referred to as "particular vehicle") include information composed of a position and relative speed of the above particular vehicle. Where the optical flows are longer and diverge from the FOE, there is strong possibility of danger.

Now referring to FIG. 21, a detailed explanation will be given of the optical flows. In an optical arrangement shown in FIG. 21, it is assumed that reference numeral 11 denotes a lens of a video camera, 12 denotes an image plane of the video camera, f denotes a distance from the lens 11 to the image plane 12, P (X, Y, Z) denotes any point on the following vehicle, and p (x y) denotes a point corresponding to the point P on the image plane 12.

From the ratio of similarity of a triangle, $$x = f \cdot X/Z \quad (1)$$

By transforming and time-differentiating this equation, $$x' = (\Delta x/\Delta t \cdot Z + x \cdot Z')/f \quad (2)$$

The component u in the x direction of the optical flow is expressed by $$u = \Delta x/\Delta t \quad (3)$$

Using it, Z can be expressed by $$Z = (f \cdot X' - x \cdot Z')/u \quad (4)$$

Now, Z denotes a relative speed between one's own vehicle and the "particular vehicle". Assuming that $$Z' = -\alpha, \quad (5)$$

Equation (4) can be transformed into $$Z=(f\cdot X'+x\ \alpha)/u \qquad (6)$$

Therefore, the x direction component of the optical flow (i.e. $\Delta x/\Delta t=u$) can be expressed by $$u=(f\cdot X'+x\alpha)/Z \qquad (7)$$

This applies to Y.

Thus, from Equation (7), as Z i.e. the distance from the particular vehicle is decreased, otherwise $\alpha$ is increased (relative speed is large), the x component of the optical flow is increased. This applies to the Y direction.

Therefore, the optical flow is longer as the distance from the "particular vehicle" is shorter or the relative speed is higher. Accordingly, a greater length of the optical flow diverging from FOE provides higher degree of danger for the particular vehicle.

The above processing is repeated for all the points on the image at timing t so that the optical flows of the entire image representative of the danger of each particular vehicle can be acquired. An alarm is sounded according to the acquired degree of danger to alert the driver of his own vehicle to the danger. This complements the limited recognition ability of a human being, and prevents the danger of a great accident or the actual occurrence thereof.

In a prior art, as shown in FIG. 22, in order to save the processing time for an object for which monitoring is not required, the white lines of a lane on which one's own vehicle runs on a straight road are detected so that the lane on which one's own vehicle runs is distinguished from an adjacent lane to define a monitoring region. The FOE point is acquired from the extension of the detected white line, and the optical flows extending radially from the FOE point are acquired for one's own vehicle lane and adjacent lane, thereby detecting a particular vehicle 102 approaching one's own vehicle. In this way, the particular vehicle is recognized on the basis of the optical flows so that the degree of danger for the particular vehicle can be automatically decided without using any particular distance meter.

The optical flow represents a moving vector on an image which is produced due to a relative movement between a camera and an object in a three-dimensional space. Of the techniques for detecting the optical flows which have been proposed hitherto, a correlation technique and a concentration gradient technique can be practically adopted at present.

The moving image picked up from one's own vehicle mixedly includes an optical flow occurring from background approaching at a very high speed and optical flow occurring from a forward vehicle approaching or going away at various speeds. The moving image is characterized in that it is changed complicatedly with elapse of time. Therefore, it cannot be assumed that changes in luminance are smooth in time and space, which is required by the concentration gradient technique, so that the optical flow cannot be detected accurately. Accordingly, the concentration gradient technique is unsuitable for the moving image to which the present invention is directed.

On the other hand, the correlation technique, which must search the corresponding points in a prescribed window in all the directions in environmental regions to compute the correlative values, requires a vast amount of computations disadvantageously. The correlation technique, however, has an advantage that it can acquire the optical flow relatively accurately for a complicate image to which the present invention is directed.

As described above, in the general correlation technique, in order to acquire the optical flow of the image at a certain timing t=T, the pixels at timing t=T−ΔT corresponding to all the pixels at timing t=T in all the directions must be searched. This requires a vast amount of computations, which may lead to search of erroneous corresponding pixels (erroneous corresponding).

The problem of detecting the wall of a road or preceding vehicle outside the monitoring region can be solved by setting a monitoring region. However, even when the corresponding pixels are searched in only the set monitoring region still, problems of processing time and detecting accuracy are not still solved.

Meanwhile, searching of the corresponding points can be made accurately for only the pixels each having a characterized texture. For example, where the corresponding points are searched between the two images picked up with a time difference of ΔT for a texture having a uniform concentration distribution such as an asphalt road, all points on the road are candidates of the corresponding points. This leads to the increase in the amount of computation and erroneous corresponding. Therefore, in order to search the corresponding points accurately, the pixels each having a characterized texture must be extracted.

The most simple technique for extracting the pixels each having a characteristic texture is to extract the edge of an image (which refers to the portion where the brightness varies on the image). However, when the edge of each image is extracted between the images picked up with a difference of ΔT, the character on the road (e.g. painted character such as "STOP") which should not be detected as an optical flow will be extracted as an "edge". This leads to an increase in the amount of computations.

Further, where a zebra zone, a pattern or character of speed limitation, etc. are painted on the road surface, optical flows will be produced from these paints. Essentially, it is intended to detect only the optical flow from an approaching vehicle. In this case, however, the optical flows from the paints may be erroneously detected as those from the approaching vehicle.

The present invention has been accomplished in order to accomplish the problems described above.

SUMMARY OF THE INVENTION

An object of the present invention is to provide an environment monitoring system and method which can prevent an object (e.g. paint on the road surface) which is not required to detect from being erroneously detected as another surrounding vehicle.

In order to attain the above object, in accordance with the first aspect of the present invention, there is provided an environment monitoring system for monitoring a relative relation between one's own vehicle and another surrounding vehicle comprising: image pick-up means for picking up two early and later images which are located at a front, rear or diagonal-rear position from one's own vehicle at two early and later timings and on the basis of the images thus picked-up, detecting white lines of one's own vehicle lane on which one's own vehicle runs; monitoring region setting means for setting a monitoring region in a region of one's own vehicle lane or an adjacent lane on the basis of the white lines thus detected; optical-flow detecting means for detecting an optical flow generated from another surrounding vehicle within the monitoring region, wherein the optical-flow detecting means comprises: means for reverse-projection converting the early image on the basis of a predetermined optical arrangement of the image pick-up means onto an x-z plane in parallel to a road surface in a real space to acquire a road surface image; means for computing a moving distance of one's own vehicle between the two timings on the basis of a time interval between the two timings and speed information of one's own vehicle; means for parallel-shifting the road surface image by the moving distance thus computed; means for projection-converting the road surface image after parallel-shifted to acquire an estimated image of the later image in timing; means for acquiring a differential image between the later image and its estimated image to extract a feature point; and means for searching a corresponding point of the feature point extracted, thereby detecting the optical flow.

In this configuration, shadow, character and dirt whose optical flow should not be detected can be entirely canceled, and the corresponding point of only the object whose optical flow should be detected can be searched.

Preferably, the optical-flow detecting means further comprises: means for, prior to projection-converting the road surface image, computing angles of the white lines in the vicinity of one's own vehicle formed together with a z-axis on the road surface image parallel-shifted to acquire an average angle thereof; and means for rotating the road surface by the average angle around an origin of the x-z coordinate.

In this configuration, an estimated image can be acquired taking a curved road into consideration. Thus, the shadow, character and dirt whose optical flow should not be detected can be entirely canceled. Therefore, when one's own vehicle runs on the curved road, the corresponding point of only the object whose optical flow should be detected can be searched.

Preferably, the environment monitoring system further comprises means for evaluating the degree of danger which decides dangerous when the average value 1 of the magnitudes of optical flows exceeds a prescribed value as regards the degree D of danger in a front, rear or diagonal-rear field of view expressed by $$D = l = (1/N) \times \sum_{i=1}^{N} li$$

(where li denotes the magnitude of the optical flow, and N denotes the number of generated optical flows).

In this configuration, irrespectively of the generated number of optical flows which depends on the type, color, size of another environmental vehicle, and environmental brightness in the daytime or nighttime, the degree of danger can be evaluated.

Preferably, the means for evaluating the degree of danger decides dangerous when the number N of the optical flows exceeds a prescribed value. Even when the relative speed between one's own vehicle and another surrounding vehicle is zero, if the distance between one's own vehicle and forward vehicle is very short, the degree of danger becomes high. If the distance between the vehicles is short, the generated number N of optical flows increases irrespectively of the type, color and size of the vehicle. In this configuration, using this fact, the degree of danger can be evaluated.

In accordance with the second aspect of the present invention, there is provided a method for monitoring a relative relation between one's own vehicle and another surrounding vehicle comprising the steps of: picking up two early and later images which are located at a front, rear or diagonal-rear position from an own vehicle at two early and later timings by an image pick-up means and on the basis of the images thus picked-up, detecting a white line of an own vehicle lane on which one's own vehicle runs; setting a monitoring region in a region of one's own vehicle lane or an adjacent lane on the basis of the white line thus detected; detecting an optical flow generated from another environmental vehicle within the monitoring region, wherein the step of detecting an optical flow comprises the steps of: reverse-projection converting the early image on the basis of a predetermined optical arrangement of the image pick-up means onto an x-z plane in parallel to a road surface in a real space to acquire a road surface image; computing a moving distance of one's own vehicle between the two timings on the basis of a time interval between the two timings and speed information of one's own vehicle; parallel-shifting the road surface image by the moving distance thus computed; projection-converting the road surface image after parallel-shifted to acquire an estimated image of the later image in timing; acquiring a differential image between the later image and its estimated image to extract a feature point; and searching a corresponding point of the feature point extracted, thereby detecting the optical flow.

In this configuration, shadow, character and dirt whose optical flow should not be detected can be entirely canceled, and the corresponding point of only the object whose optical flow should be detected can be searched.

Preferably, in the method according to the second aspect of the present invention, the step of detecting an optical-flow further comprises:

if prior to projection-converting the road surface image, computing angles of the white lines in the vicinity of one's own vehicle formed together with a z-axis on the road surface image parallel-shifted to acquire an average angle thereof; and rotating the road surface by the average angle around an origin of the x-z coordinate.

In this manner, an estimated image can be acquired taking a curved road into consideration. Thus, the shadow, character and dirt whose optical flow should not be detected can be entirely canceled. Therefore, when one's own vehicle runs on the curved road, the corresponding point of only the object whose optical flow should be detected can be searched.

The above and other objects and features of the present invention will be more apparent from the following description taken in conjunction with the accompanying drawings.

BRIEF DESCRIPTION OF THE DRAWINGS

FIG. 3 is a flowchart of the outline of an operation in the environment monitoring system according to the present invention;

FIG. 4 is a flowchart showing an example of a method of estimating an own lane region in the environment monitoring system according to the present invention;

FIG. 13 is a flowchart showing an example of the method for detecting an optical flow in an environment monitoring device according to the present invention;

FIGS. 14A–14I show views for explaining the process for extracting the optical flow in an environment system according to the present invention;

DESCRIPTION OF THE PREFERRED EMBODIMENTS

Figure 1:
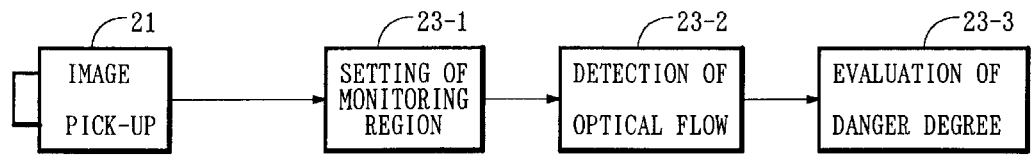
FIG. 1 is a basic block diagram of an environment monitoring system.

Now referring to the drawings, an explanation will be given of embodiments of the present invention.

Figure 2:
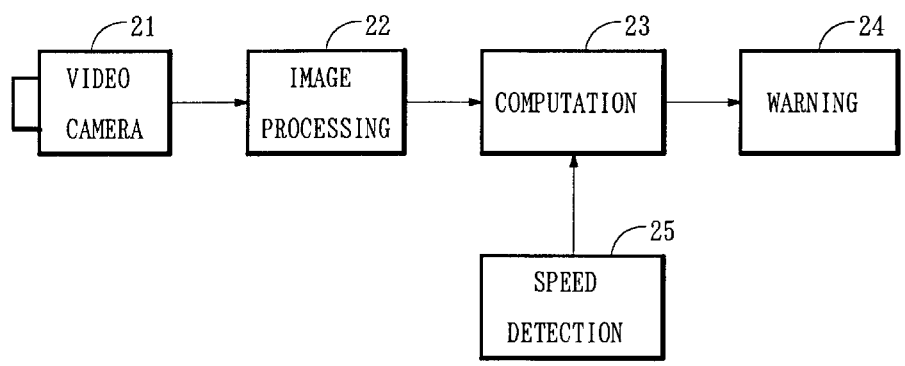
FIG. 2 is a block diagram showing a configuration of the environment monitoring system according to the present invention.

FIG. 2 is a block diagram showing a configuration of the environment monitoring system according to the present invention. It should be noted that the explanation will be made for a case where the environment monitoring system monitors the front view or image of one's own vehicle.

In FIG. 2, reference numeral 21 denotes a video camera for picking up a front image; 22 an image processor for processing the image taken from the video camera 21; 23 an arithmetic unit for making various computations and decision of the degree of danger on the basis of the processing result from the image processor 22; 24 a warning device; and 25 a speed detecting device for detecting the speed of an own vehicle (i.e. moving speed of the video camera 21).

FIG. 3 is a flowchart showing the outline of the operation of the environment monitoring system according to the present invention.

First, two images successive in time (at timing t0−Δt and timing t) acquired when running on a road such as a speed way are taken in the arithmetic unit 23 configured by a computer (steps S1 and S2). Next, on the image at timing t, the lane marker (hereinafter referred to as "white line" painted in white or yellow indicative of the lane (hereinafter referred to as "one's own lane") on which an own vehicle runs is detected to estimate the region of one's own lane (step S3).

Using the image at timing t−Δt as well as the image at timing t, the optical flow produced from other vehicles which resides in one's own vehicle region is detected (step S4). Thereafter, on the basis of the optical flow thus detected, the degree of danger ahead of the vehicle is evaluated (step S5). If it is decided dangerous, a warning signal for warning a driver is issued to a warning device 24 (step S6).

As understood from the above description, the arithmetic unit 23 serves as an optical flow detecting means 23-2 and danger degree evaluating means as well as the monitoring region setting means 23-1.

A detailed explanation will be given of each processing in the present invention.

[Acquisition of a Moving Image Ahead of an Own Vehicle]

In steps S1 and S2 in FIG. 3, two successive images in time are taken into the arithmetic unit 23 through the video camera 21 and image processing device 22. In step S3, using the images at an earlier timing t−Δt and a later timing t, estimation of one's own vehicle region which is first image processing is carried out.

In accordance with the present invention, in order that the front view or image can be monitored accurately even while an own vehicle runs on a road having many relatively abrupt curves, such as a speed way, the processing of estimating one's own vehicle lane is carried out to define a monitoring region.

A conventional environment monitoring system is directed to a straight road or a gently-curved road of the speed way, but not directed to a relatively abruptly-curved road. Therefore, in the conventional environment monitoring system, on the assumption of the straight road or very gently-curved road, the monitoring region is previously set, or otherwise, on the basis of the linear approximation of the white line in the neighborhood of one's own vehicle, the region encircled by two straight segments is set as the monitoring region.

Figure 22:
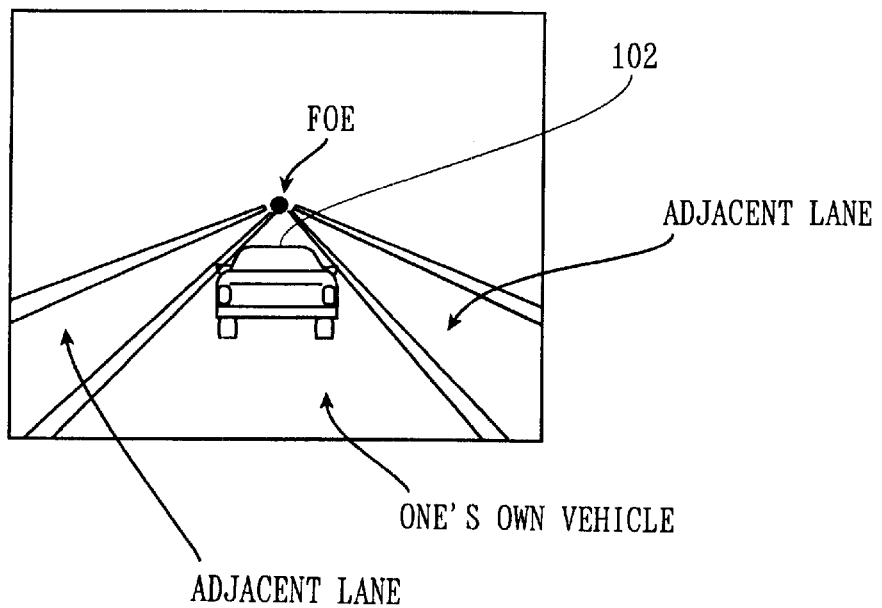
FIG. 22 is a view for showing the position of FOE on a straight road.

Therefore, there is no problem when one's own vehicle runs on the straight road as shown in FIG. 22. However, when one's own vehicle runs on the relatively abruptly-curved road, the wall and signs which should not be detected or the vehicle which is running on an adjacent lane may come in the monitoring lane. Conversely, the vehicle ahead of one's own vehicle which is running on one's own vehicle lane may not come in the monitoring region.

One's own vehicle lane is generally estimated in such a way that left and right two white lines are detected, the region encircled by the two detected white lines is decided as an own lane and this region is defined as a monitoring region. Such a method has been commonly adopted in the conventional environment monitoring system.

Generally, the white line will be detected in a smaller size on an image plane when it is located farther. Therefore, where "edge" information described previously is used for curve adaptation, the white line farther located gives less reliability of the edge of the white line. Specifically, as regards the white line farther located, its edge cannot be distinguished from other edges, thus producing many errors in edge extraction. Thereafter, a certain curve will be adapted to the edge containing the error so that in the worst case, a curve cannot be properly adapted to a nearby white line because of the error in the white line farther located.

In this way, it is very difficult to adapt strictly a single curve on the image plane to any road including a relatively abruptly-curved road. Taking simplification of processing and required accuracy into consideration, the present invention adopts the following procedure.

[Estimation of One's Own Vehicle Lane]

Now referring to the flowchart of FIG. 4, a detailed explanation will be given of a method of estimating an own vehicle lane. FIG. 4 is a flowchart showing an example of the method of estimating one's own vehicle lane in an environment monitoring system according to the present invention.

As seen from FIG. 4, the process of estimating one's own vehicle lane in an environment monitoring system according to the present invention includes step of dividing a region in which a road surface may be located into small regions (step S3-1); extracting edges which are candidates of a white line in order to detect the white line accurately using coordinates of the virtual FOE acquired for each of the divided small regions of a previous image (step S3-2); adapting a segment to each of the small regions for a group of edges which represent the white line in the greatest probability from a plurality of groups of edges extracted in step S3-2, thereby determining the segment in each small region (step S3-3); and estimating the crossing point of the left and right two segments of each small region as the coordinate of a virtual FOE (step S3-4).

The arithmetic unit 23 constituting one's own vehicle lane region estimating means 23-1 serves as a small-region dividing means, edge extracting means, white line determining means and a virtual FOE estimating means.

The division into small regions in step S3-1 in FIG. 4 will be explained.

Many patent applications which relate to detection of a white line on a road image in order to assist driving have been filed. The present invention intends to detect the white line in such a way not influenced by shadow, dirt or character on a road and hiding or intermission of the white line. The present invention also intends to deal with a relatively large number of abruptly-curved roads in a speed way as well as straight roads. The high speed of processing is very important in view of the nature of the driving assisting system. Therefore, simplification of individual processing must be maximized.

Figure 5A:
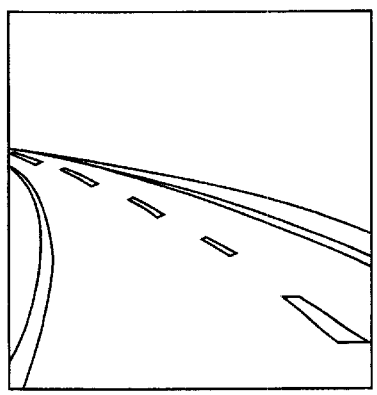
FIGS. 5A and 5B are views showing an original image and a manner of dividing the original image into small five regions, respectively.
Figure 5B:
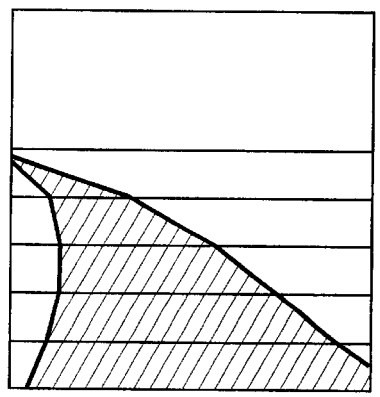

Therefore, in accordance with the present invention, the range corresponding to a road surface on the original image in FIG. 5A is divided into five small regions as shown in FIG. 5B (step S3-1). This intends to detect the left and right two segments of each small region by linear approximation using e.g. the HOUGH transformation for the edges of each small region and to define the region encircled by the two detected segments as an own vehicle lane . Now, these small regions are referred to as small region No.1, small region No. 2, . . . small region 5 in a direction from bottom to top on the image, i.e. from near to one's own vehicle to far therefrom on a real space. In FIG. 5B, although the range corresponding to the road surface is divided into five small regions, it may be divided into any number of small regions.

The edge extraction in step S3-2 in FIG. 4 will be explained.

In step S3-2, using the coordinate of the virtual FOE acquired for each of the small regions into which the previous image estimated in step S3-4 (which will be described later) is divided, in order to detect the white line accurately, the edge that is a candidate of the white line will be detected. If there is a small time interval between the successive two images, the positions of the virtual FOE Nos. 1, . . . 5 will not move greatly between two images. In accordance with the present invention, using such a characteristic, the white line is detected in such a way not influenced by shadow, dirt or character on a road and hiding or intermission of the white line. In order to facilitate the understanding of this characteristic, the estimation of the virtual FOE in step S3-4 will be explained precedently.

Figure 6:
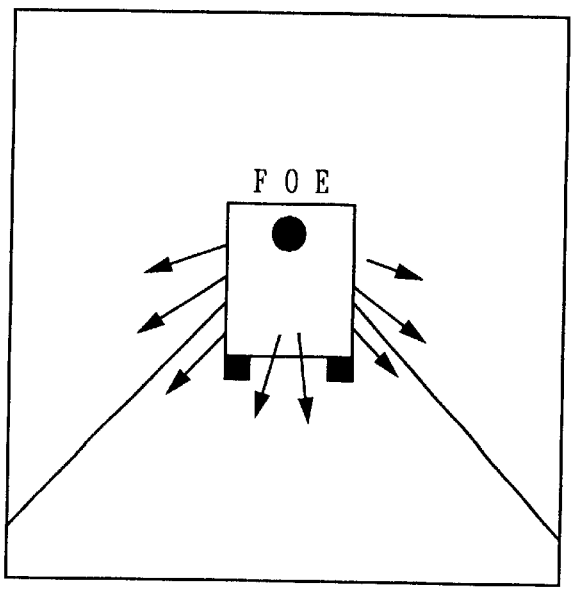
FIG. 6 is a view showing FOE while an own vehicle runs on a straight road.

Now it is assumed that one's own vehicle is running on a straight road in a moving image ahead of one's own vehicle to which the present invention is directed. In this case, as seen from FIG. 6, all objects which relatively approach a camera in a real space move in directions diverging radially from a certain fixed point on an image plane. On the other hand, all the objects which leave relatively form the camera move in directions converging into the same point. The one point on the image is referred to a FOE (Focus Of Expansion). FIG. 6 shows the FOE during the running on a straight road.

Figure 7:
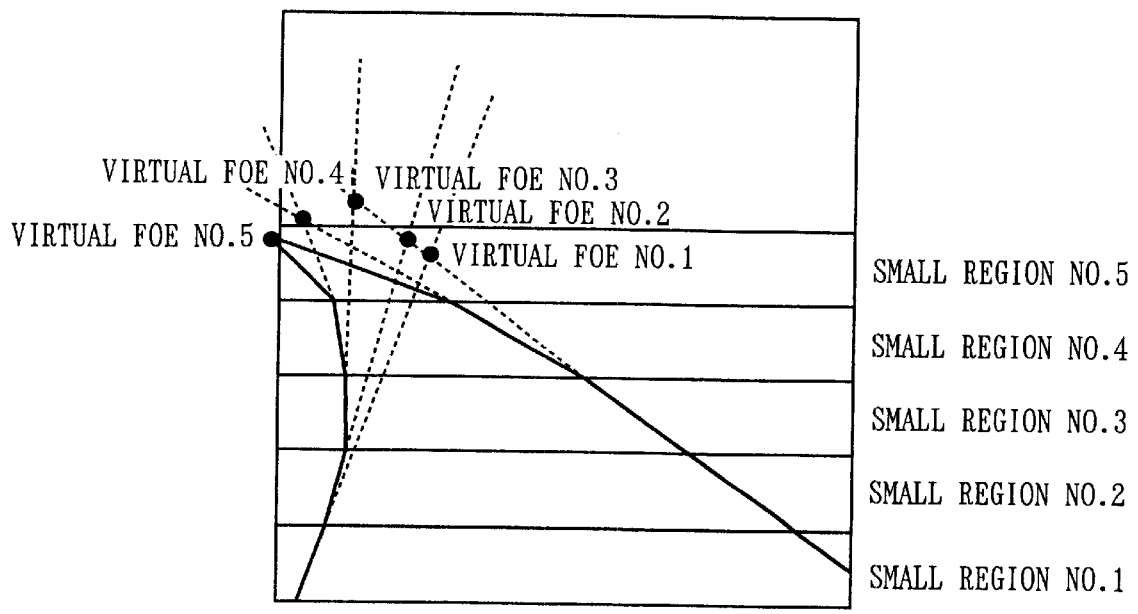
FIG. 7 is a view showing a virtual FOE for each small region.

However, where one's own vehicle is running on abruptly-curved road to which the present invention is directed, there is not an FOE in a strict meaning. Therefore, in the present invention, as seen from FIG. 7, the crossing points of the lines extending from the left and right two segments of the respective small regions Nos. 1, . . . 5 are defined as virtual FOE Nos. 1, . . . 5 (step S3-4). FIG. 7 shows the virtual FOE in each of the small regions and optical flows therefrom.

Generally, while running on a straight road, the FOE will not move on the moving image. On the other hand, the virtual FOE defined in accordance with the present invention moves on the moving image. But, where the time interval between the successive two images is small, the amount of movement of the virtual FOE between the two images is also minute. In accordance with the present invention, using such a characteristic, the white line is detected in such a way not influenced by shadow, dirt or character on a road and hiding or intermission of the white line (described later).

As described above, while running on the straight road, all objects which relatively approach a camera in a real space move in directions diverging radially from a certain fixed point on the image on an image plane, whereas all the objects which leave relatively form the camera move in directions converging into the same point. On the other hand, while running on abruptly-curved road, although there is not an FOE in a strict meaning, the objects residing at the small regions 1, . . . 5 move in a radial direction from the virtual FOE, . . . 5 on the moving image. In accordance with the present invention, using the characteristic, even while running on the curved road, the optical flow can be detected accurately at a high speed (described later).

The explanation will be returned to step S3-2 of extracting the edge which is a candidate of the white line using the coordinate of the virtual FOE in order to detect accurately the left and right two lines indicative of one's own vehicle lane for each of the small regions divided in step S3-1.

In an ideal image in which the luminance of the road surface is uniformly low whereas that of the white line is sufficiently high, the white line can be easily detected. However, in an actual road image, as described above, a shadow, character and dirt are present on the road surface, or the white line may be hidden by other vehicles or discontinue. In the step of extracting the edge, it is desired to remove all the edges other than those of the white line and select only the edges of other objects of the white line. However, it is very difficult to carry out this on the actual image.

Therefore, in the present invention, in the step of edge extraction, the edge at issue is not decided completely on whether it is that of the white line or other edges, but a group of edges which look like the edge of the white line are selected as candidates. Thereafter, the most possible combination of those of the white line is-selected from the extracted candidates.

An explanation will be given of a technique of extracting a plurality of groups of edges which look like those of the white line. Actually, although the same processing will be carried out for all the five small regions, now, only the processing for the small region No. 3 will be explained for simplicity of explanation.

Figure 8A:
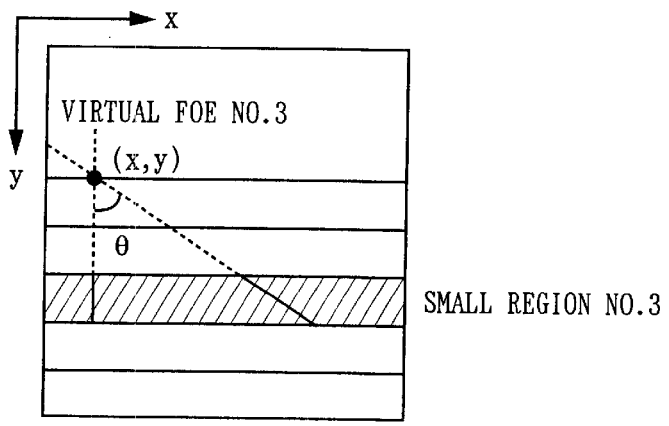
FIGS. 8A and 8B are views showing a method of extracting an edge.
Figure 8B:
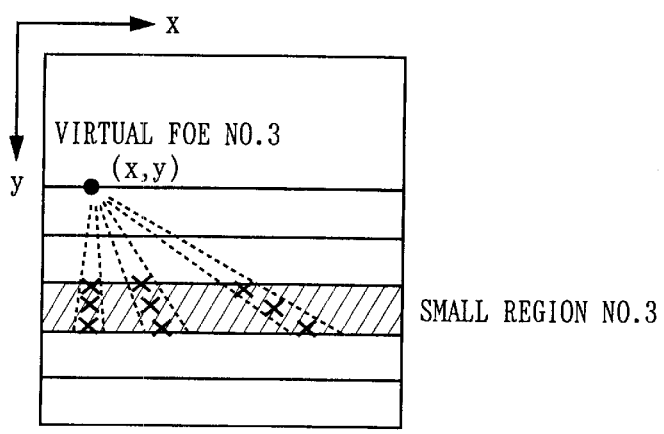

Now it is assumed that the edge extraction for the image at timing t=T will be carried out. Around the coordinate the virtual FOE No. 3, which has been determined by processing the previous image at the timing close to the present timing, the fan-like region having a prescribed minor angle is rotated little by little. The edge extraction is carried out for each fan-like region. If the number of the edges exceeds a threshold value, these edges are taken as a group of edges of the candidate of the white line. FIG. 8B shows a manner of edge extraction.

Meanwhile, as described above, if the time interval is minute, the position of the virtual FOE does not vary. Therefore, such processing completely removes the edges having a direction which is greatly different from that of the actual white line. Simultaneously, even if there is any edge having the same direction as that of the actual white line, the processing of FIG. 8B permits the edges of the white line to be separated from other edges.

In this way, the group of edges which appear the white line can-be extracted (step S3-2).

Determination of the line segment of each small region will be explained in step S3-3 in FIG. 4.

Figure 9:
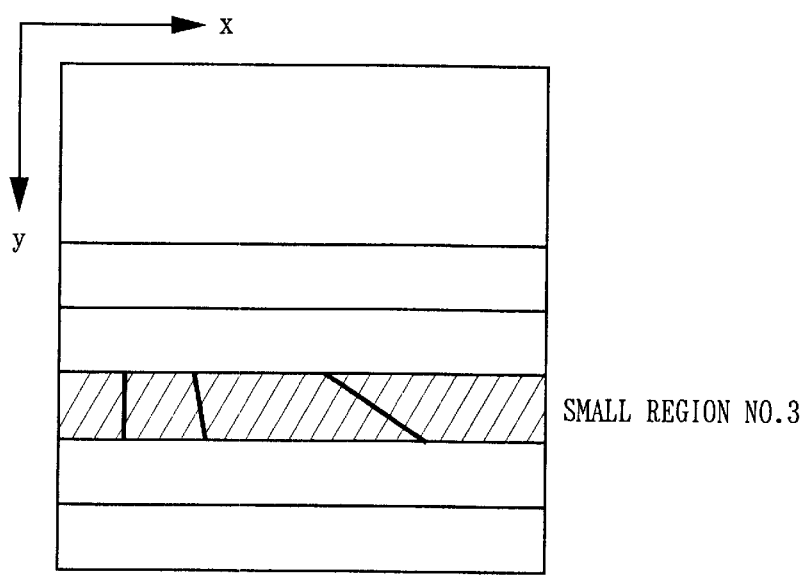
FIG. 9 is a view showing an example of linear approximation based on the HOUGH transformation.

A line segment is adapted to the group of edges which appear most probably of the plurality of edge groups extracted in step S3-2, thereby detecting the left and right white lines indicative of one's own vehicle lane. In this case, as shown in FIG. 9, the linear approximation is made for the plurality of edge groups using the HOUGH transformation. Thereafter, of the plurality of line segments thus acquired, two lines which appear most probably like the white line will be selected under the following two conditions. FIG. 9 shows an example of the linear approximation using the transformation.

(1) Coupling of the White Line Segments by Sequential Processing

In the present invention, the range in which the road surface may be located on the image is divided into five small regions, and the left and right two line segments indicative of one's own vehicle lane are detected for each divided small region. If the line segments are detected properly, the left and right line segments in adjacent two small regions continue with no interruption.

In the present invention, in determining the liner segment which appears the white line, such a characteristic of continuation of the white line between the small regions is used. In this case, the characteristic that the white line located farther in a real space is picked up with a smaller size on an image plane is taken in consideration. This means that as regards the white line farther located, the other edges as well as those of the white line might be detected in step S3-2. Therefore, the group of edges extracted, or the line segments approximated by the HOUGH transformation have lower reliability as the white line as they are located farther from one's own vehicle like the small regions No. 1, No. 2 . . . No. 5.

Figure 10:
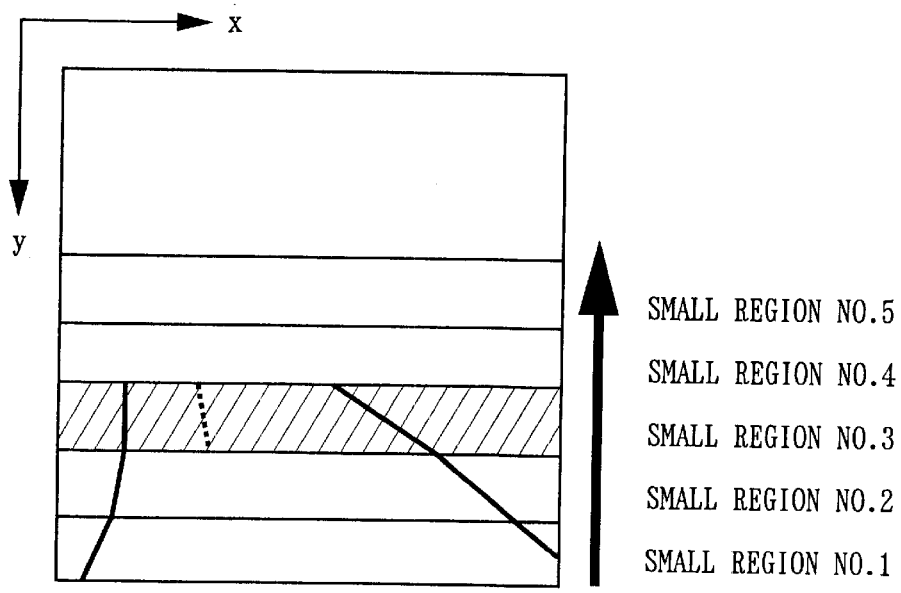
FIG. 10 is a view showing coupling of a white line in sequential processing.

In accordance with the present invention, the white-line seeming line segments will be determined successively in the order of small regions No. 1, No. 2. . . . No. 5. For example, where the two lines in each of the small regions No. 1 and No. 2 have been determined as line segments as indicated by solid line in FIG. 10, in view of the coupling of the left and right line segments in the small regions Nos. 1 and 2, the line segment in the small region No. 3 indicated by dotted line in FIG. 10 is removed. Thus, the two line segments indicated by bold solid line are decided as the white line. FIG. 10 shows the coupling of the white line segments by the sequential processing.

(2) Time Continuity of the Coordinate and Angle θ of a Virtual FOE

In this step, the left and right two line segments which appear the white line at the highest probability are selected from the plurality of the line segments approximated by the HOUGH transformation. In this case, it is more preferable to select a combination of the left and right line segments rather than selecting the two left and right line segments individually. Therefore, the following characteristic is used as the second condition.

As described above, if the time interval is minute, the position of the virtual FOE defined by the present invention does not vary greatly. Therefore, as seen from FIG. 11, the coordinates (x1, y1), (x2, y2) and (x3, y3) of the crossing points extended from the left and right line segments are computed and the differences between those coordinates and the coordinate of the virtual FOE No. 3 on the previous image close in time are computed.

Figure 11:
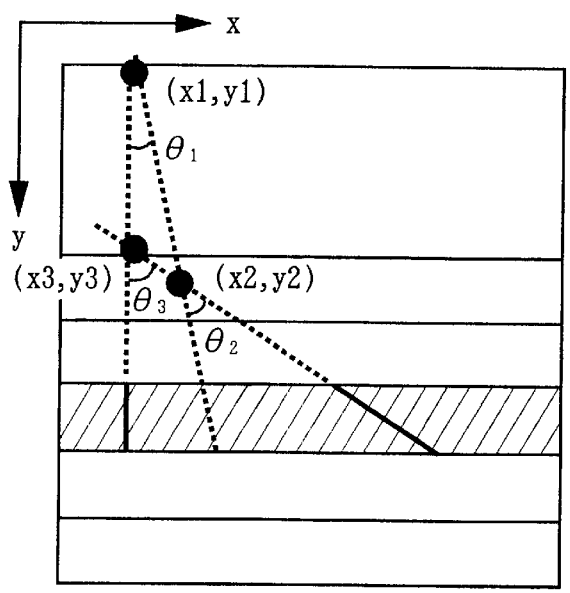
FIG. 11 is a[]view showing time sequence of the coordinates and angle θ of a virtual FOE.

Further, as seen from FIG. 11, the angles θ1, θ2 and θ3 formed by the left and right two line segments are computed, and the differences between those angles and the angle θ formed by the left and right two line segments determined on the previous image are also computed.

On the basis of the differences in the coordinate of the FOE and the angle formed by the two line segments, two left and right line segments which appear the white line at the highest probability are selected as a single combination. FIG. 11 shows the time continuity of the coordinate and angle θ of the virtual FOE.

In this way, in accordance with the present invention, on the basis of the above two conditions, the left and right two line segments indicative of one's own vehicle lane are determined for each small region (step S3-3). On the basis of the range encircled by the left and right two lines for all the small regions Nos. 1 . . . 5, one's own vehicle lane is estimated (step S3 in FIG. 3).

Figure 12:
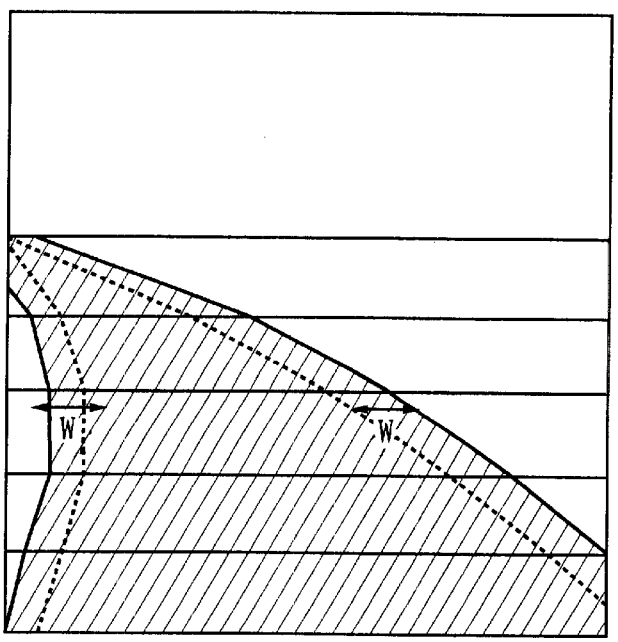
FIG. 12 is a view showing an own vehicle lane region on a road.

In this case, if one's own vehicle lane is determined using the two line segments themselves, the top of the forward vehicle falls outside one's own vehicle lane because the forward vehicle has a certain height in a real space. In view of this, as shown in FIG. 12, the range enlarged externally by a certain width from the two acquired line segments is defined as one's own vehicle lane. FIG. 12 shows one's own vehicle lane on a road.

In this way, the estimation of one's own vehicle lane is completed.

After the left and right two line segments in the small regions Nos. 1, . . . 5 have been determined in step S3-3, in step S3-4, the crossing points extended from those line segments are set as virtual FOE Nos. 1, . . . 5, respectively.

When there is no virtual determined FOE, i.e. the first image of the successive images is to be processed, the edge is detected by the known technique and the detected edge is processed to determine a white line. On the basis of the white line thus determined, the virtual FOE must be determined for each of the small regions. However, once the virtual FOE has been determined, using this virtual FOE, the edge which is a candidate of the white line can be detected simply and accurately.

[Detection of the Optical Flow]

Now referring to FIGS. 1 and 3, an explanation will be given of the detection of the optical flow in step S4 in FIG. 3. FIG. 13 is a flowchart showing a method of detecting the optical flow in an environment monitoring device according to the present invention.

As seen from FIG. 13, the optical flow detecting method comprises the steps of: extraction of a feature point for minimizing the number of pixels used for searching corresponding points or detecting the optical flow (S4-1), and limitation of the direction of searching the corresponding point for minimizing the number of the directions of searching the corresponding points (S4-2).

First, in accordance with the present invention, the number of pixels used for searching corresponding points or detecting the optical flow is minimized. In this case, the number of the pixels used for the corresponding points is reduced. In addition, the corresponding points are searched for only another vehicle around the region for which the optical flow is to be detected. The wall outside one's own vehicle lane not to be detected, shadow or character on a road surface are removed previously to a maximum degree. The searching of the corresponding points for the corresponding pixels is not carried out (S4-1).

Further, in accordance with the present invention, searching the corresponding points is not carried out for all the directions. Specifically, the searching is carried out for only the direction to which the surrounding vehicle to be detected may move, but not carried out for the unnecessary direction to which the surrounding vehicle does not move apparently (step S4-2).

In accordance with the present invention, in the step of detecting the optical flow, the above two kinds of processing are carried out to solve the problem of a correlation technique that it provides a vast amount of computation and a large number of erroneous corresponding points.

First, an explanation will given of the extraction of a feature point in step S4-1 in FIG. 13.

In step S4-1, the pixels whose optical flows should not be detected are removed to the maximum degree, and only the pixels constituting the forward vehicle to be detected are extracted. The extraction processing will be explained in detail.

On the basis of one's own vehicle estimated in step S3 in FIG. 3, the monitoring range where the optical flow should be detected is set as shown in FIG. 12. Therefore, the problem that the wall and preceding vehicle outside one's own vehicle are detected while running on the curved road will be solved.

In accordance with the present invention, the stationary objects on the road surface, such as shadow, character, dirt, etc. which should not be detected are removed from the pixels each having a characteristic texture on the image. The remaining pixels are referred to as "feature points". These feature points are extracted to reduce the amount of computation at the next step of searching the corresponding points.

A detailed explanation will be given of the processing.

Figure 15:
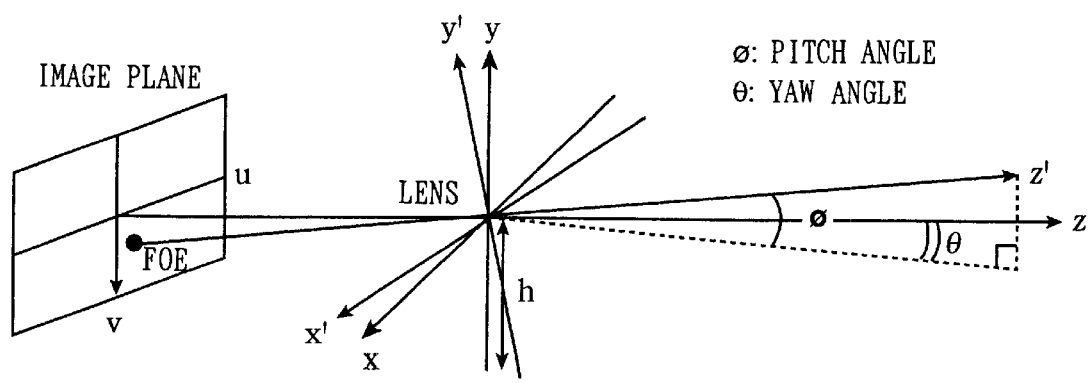
FIG. 15 is a view for explaining an optical arrangement.

The processing as shown in FIG. 14 will be carried out to extract the feature points on the image at timing t=T. The image (FIG. 14A) in a previous frame (t=T−ΔT) is inverted-projection converted according to an optical arrangement as shown in FIG. 15 using Equations (8) and (9) into a x-z plane in parallel to a real space, thereby forming the road image as shown in FIG. 15B.

$$x = h \times (-f \sin\theta + u \cos\theta)/(v \cos\phi - f \sin\phi \cos\theta - u \sin\phi \cos\theta) \quad (8)$$

$$z = h \times (f \cos\phi \cos\theta + u \cos\phi \sin\theta + v \sin\phi)/(v \cos\phi - f \sin\phi \cos\theta - u \sin\phi \cos\theta) \quad (9)$$

Using the speed information of one's own vehicle detected and recorded by the speed detector 25 and the time interval Δ between successive two images, the moving distance of one's own vehicle between the frames is computed. The road surface image shown in FIG. 14B is shifted in parallel into the image shown in FIG. 14C.

Figure 16A:
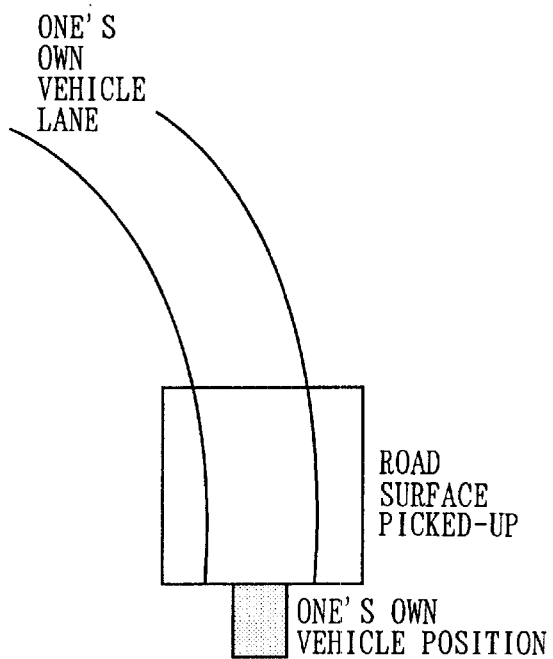
FIGS. 16A–16C are conceptual views showing the states of curve running.
Figure 16B:
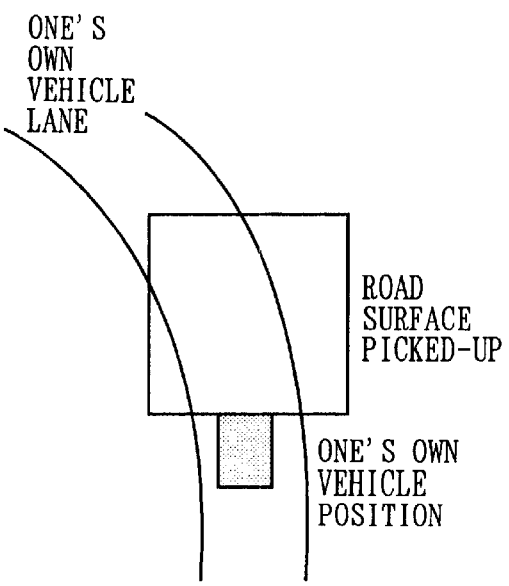
Figure 16C:
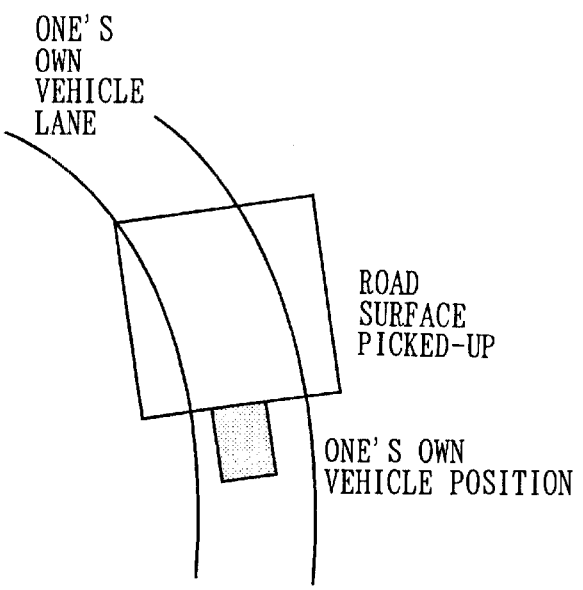

Assuming that one's own vehicle is running on a curved road, FIG. 16 is the conceptual view of the road surface viewed from above or a x-z plane. It is assumed that when one's own vehicle resides at the respective positions as shown in FIGS. 16A, 16B and 16C, the road surface area picked up corresponds to the range encircled by square. Now it is assumed that the road surface as shown in FIG. 16A has been picked up at timing t=T−ΔT. By shifting the image picked up by the moving distance of one's own vehicle as shown in FIG. 14C, the picked-up state of the road surface as shown in FIG. 16B is estimated. However, when one's own vehicle runs actually on the curved road, the driver does not always drive one's own vehicle straight ahead, but minutely steers the wheel according to the curvature of the running curved road. Therefore, the road surface actually picked up at timing t=T is as shown in FIG. 16C.

Therefore, in accordance with the present invention, as seen from FIG. 14D, the angles $\phi_L$ and $\theta_R$ formed by the white lines in the neighborhood of one's own vehicle and the z-axis are computed on the road surface image after parallel shifting to acquire average value θ' thereof. Thereafter, the image is rotated by the angle θ' around the origin on the x-z coordinate to create the image as shown in FIG. 14E.

The resultant image is projection-converted to acquire an estimated image as shown in FIG. 14F.

The estimated image, since the original image at timing t=T−Δ, after inverse-projection converted, has been shifted in parallel by a moving distance of one's own vehicle, contains only the object estimated properly which is located at the same height as the road surface and stationary. Therefore, the undesired object such as the shadow, character, dirt, etc. on the road surface whose optical flow should not be detected has been estimated properly, whereas the surrounding vehicle whose optical flow should be detected, which has a certain height, has been erroneously estimated. Further, since the image has been rotated, even when running an abrupt curved road to which the present invention is directed, proper estimation can be made for the above undesired object.

Thus, if a difference between the original image at t=T as shown in FIG. 14G and the image in the subsequent frame (t=T) estimated from the original image at t=T−ΔT is taken, as shown in FIG. 14H, shadow, character, dirt, etc. on the road surface whose optical flow should not be detected are entirely canceled, and only the surrounding vehicle whose optical flow should be detected is left. The image having the edges extracted from the differential image is referred to as a feature point image (step S4-1).

The corresponding points are searched for only the feature points extracted by the above processing. Thus, the corresponding points can be searched for only the object to be detected, such as the surrounding vehicle running on one's own vehicle lane. In accordance with the present invention, as compared with the prior art in which the corresponding points are searched for all the pixels, the quantity of computation can be reduced, and the number of the corresponding points which are erroneously detected can be reduced.

An explanation will be given of the limitation of the direction of searching the corresponding points.

By extracting the feature points in step S4-1, the number of pixels subjected to the searching of the corresponding points is greatly reduced so that the problem of processing time and detection accuracy can be solved to a certain degree. Nevertheless, if the corresponding points are searched in all the directions, the quantity of computation is increased and the number of the corresponding points erroneously detected is increased.

For this reason, it is intended that the corresponding points are searched for only the direction(s) in which the forward vehicle to be detected may move but not searched for the direction in which it does not move apparently.

Figure 17:
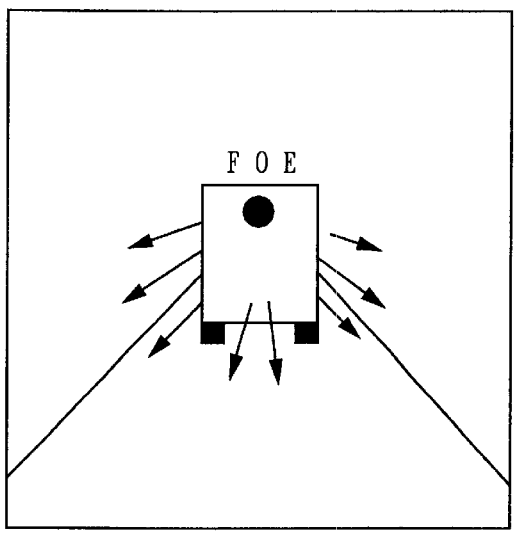
FIG. 17 is a view showing the generating direction of an optical flow during running on a straight road.

Assuming that one's own vehicle is running on a straight road, as seen from FIG. 17, for all objects which relatively approach a camera in a real space move, their optical flows are generated in directions diverging radially from a certain fixed point on an image plane. On the other hand, for all the objects which leave relatively from the camera, their optical flows are generated in directions converging into the FOE. Therefore, it is possible to limit the direction of searching the corresponding points into the radial direction around the FOE. FIG. 17 shows the directions in which the optical flows are generated during the running on a straight road.

Figure 18A:
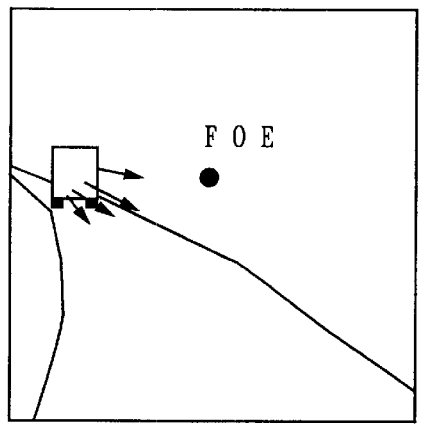
FIGS. 18A–18C are views showing the generating direction of an optical flow during running on a curved road.
Figure 18B:
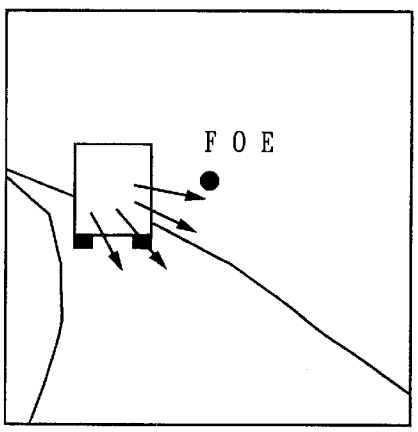
Figure 18C:
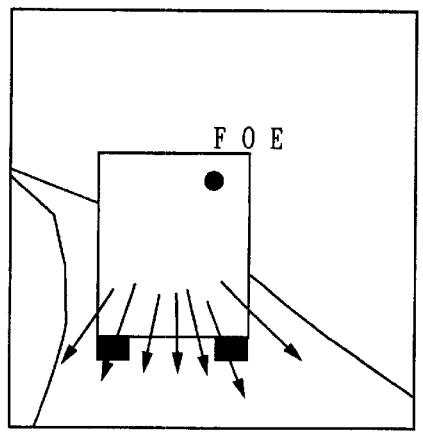

However, during the running on an abruptly curved road to which the present invention is to directed, there is no FOE in a strict meaning. It is now assumed that one's own vehicle runs on the curved road. For example, the directions of the optical flows generated when the forward vehicle which is located very far approaches are such as shown in FIG. 18A. Those when the forward vehicle which is located relatively far approach are such as shown in FIG. 18B. Those when the forward vehicle which is located very near are such as shown in FIG. 18C. In short, it can be seen that during the running on an abruptly curved road, there is no FOE when running on the straight road, but the optical flow does not diverge from the one point on the image plane.

For this reason, in accordance with the present invention, the virtual FOE defined (or estimated) in step S3-4 in FIG. 4 is adopted. The positions of the virtual FOE1, . . ., 5 are crossing points of extended left and right two line segments in each of the small regions Nos. 1, . . . 5.

Generally, on the real space, the driver turns the steering wheel so that his own vehicle is always in parallel to the left and right two line segments indicative of his own lane. Therefore, it seems that on the image plane, the object in each of the small regions moves in the radial directions from the crossing point of the left and right two line segments, i.e. virtual FOE.

Figure 19:
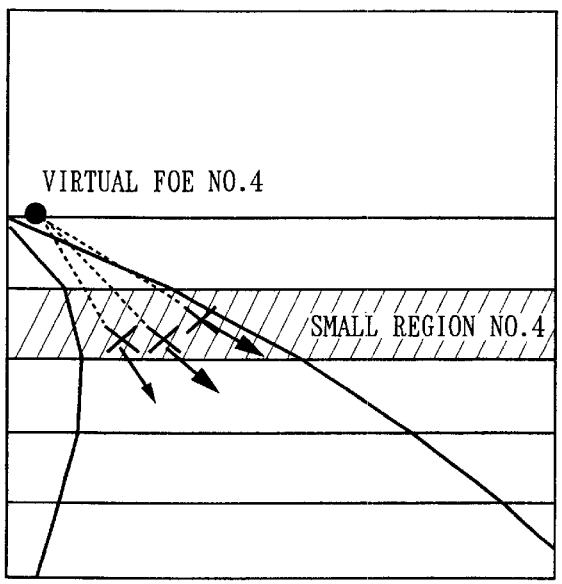
FIG. 19 is a view showing searching the corresponding points.
Figure 20A:
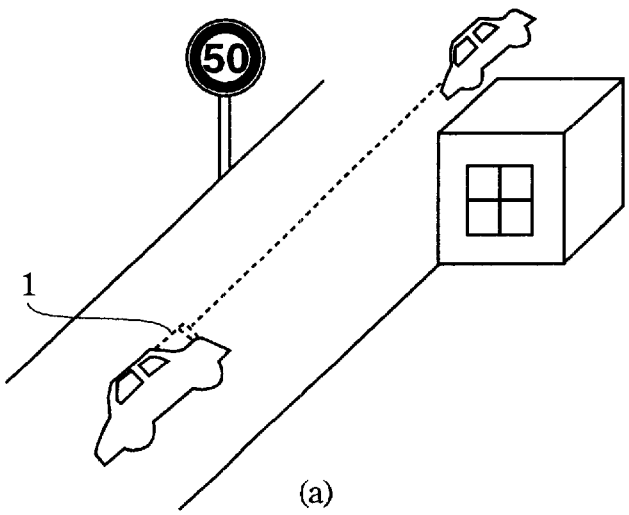
FIGS. 20A–20D are views for explaining changes in the background image acquired by a video camera.
Figure 20B:
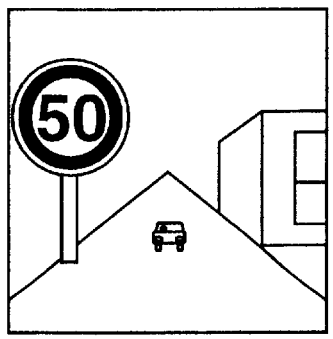
Figure 20C:
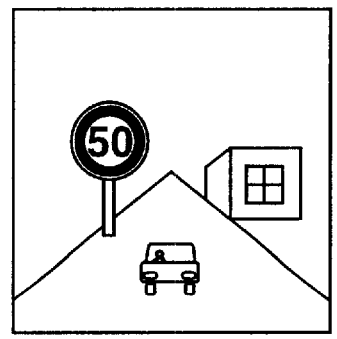
Figure 20D:
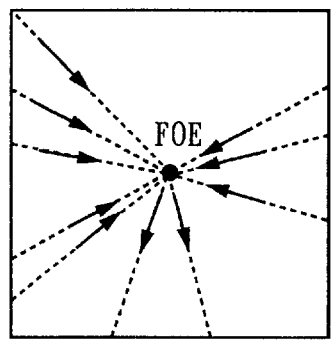
Figure 21:
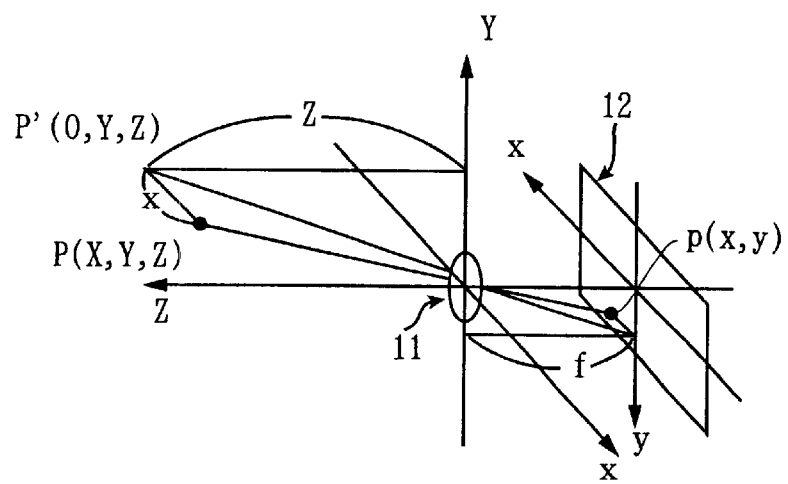
FIG. 21 is a view for explaining the method of detecting an object such as an obstacle.

Therefore, in accordance with the present invention, as regards the feature points which are located in each of the small regions Nos. 1, . . . 5, the corresponding points are searched in the limited directions around each of the virtual FOEs Nos. 1 . . . 5. Specifically, as seen from FIG. 19, where the feature point resides in the small region No. 4, the corresponding point is searched in only the radial directions around the virtual FOE No. 4 (step S4-2). FIG. 19 shows the directions of searching the corresponding points.

Through such processing, even while one's own vehicle runs on the curved road, the optical flows can be detected at high speed and with high accuracy.

Thus, detection of the optical flows is completed.

The components of the optical flows can be actually acquired in the same manner as in the prior art, i.e. using Equation (7) in the explanation of the conventional vehicle environment monitoring system.

[Evaluation of Danger Degree]

An explanation will be given of the evaluation of the danger degree in step S5 in FIG. 3.

On the basis of the optical flows detected in each processing as described above, the danger degree must be evaluated to give a warning to the driver.

The standard of evaluating whether or not there is a general danger when running on a speed way is:
(1) more dangerous as the distance between one's own vehicle and forward vehicle is shorter, and
(2) more dangerous as the relative speed between one's own vehicle and the forward vehicle is higher.

The optical flow is larger as the object is nearer to the camera in a real space and the relative speed is higher. Therefore, assuming that the dimension of each optical flow is li and the number of the optical flows generated is N, the evaluated value D of the degree of danger which can satisfy the above evaluation standard can be acquired by the total sum L from simple addition of the optical flows within the monitoring region:

$$D = L = \sum_{i=1}^{N} Li \tag{10}$$

However, in this method, the magnitudes of all the optical flows are added, the degree of danger greatly depends on the number N of the optical flows. The number N varies greatly according to the kind, color and size of the vehicle running forward. Further, when running during the nighttime and through a tunnel, the number of the optical flows generated is much fewer than during the daytime. Therefore, in the present invention, the degree of danger can be evaluated by not the total sum of the dimensions of the optical flows, but by the average value of the dimensions of the optical flows $$D = l = (1/N) \times \sum_{i=1}^{N} Li \tag{11}$$

There is a problem owing to using the detection of an optical flow. This problem is common to both the cases of using the total sum L and average value 1. Namely, where the forward vehicle does not move entirely between the two images successive in time, i.e. the relative speed between one's own vehicle and forward vehicle is zero, the magnitude of the optical flow is zero so that both the total sum L and average value are zero.

Such a case corresponds to where the most correlative feature point is found at the position of the optical flow of zero as a result that the optical flow is acquired through the searching of the corresponding point for each feature point acquired by step S4-1, i.e. the feature point does not move so that the optical flow of zero is extracted. This occurs because the optical flow of zero is extracted from the feature point of the other vehicle running at the relative speed of zero (speed equal to that of one's own vehicle) in the vicinity of one's own vehicle.

However, even if the relative speed is zero between one's own vehicle and the forward vehicle (other vehicle), if the distance between one's own vehicle and the forward vehicle is very short, it seems that one's own vehicle is normally in a dangerous state.

Therefore, in order to decide that such a state is dangerous, in accordance with the present invention, the following value (evaluated value of the degree of danger) will be also used. Now, where the distance between the vehicles is long, the degree of danger can be evaluated in terms of the average value of the optical flows. In this case, therefore, the degree of danger may be decided for only the case where the relative speed is zero and the distance between the vehicles is so much near as to be dangerous.

For this purpose, the number of the generated optical flows is used as an evaluated value of the degree of danger.

As described above, the number of the generated optical flows varies according to the type, color, size of a forward vehicle, and time or environment such as running during the daytime or nighttime or through a tunnel.

This is problematic under a normal circumstance. However, this is not problematic where the distance between the vehicles is so much near as to be dangerous. Namely, in such a case, a large number of the optical flows are generated irrespectively of the type, color, size. While running during the nighttime or through a tunnel, if the forward vehicle is far, since it is dark, a small number of optical flows are generated. On the other hand, if the forward vehicle is very near, since the rear of the forward vehicle is illuminated with a head light of one's own vehicle, a large number of optical flows are generated, thus given the higher degree of danger.

For the reasons described above, in accordance with the present invention, as the evaluated value of the degree of danger, under a normal circumstance, the average value 1 of the optical flows is used. In order to remedy the defect thereof, where the distance from the forward vehicle is very short, the number N of the generated optical flows inclusive of the optical flow of zero is used. It is decided dangerous when either of the two values 1 and N exceeds a prescribed threshold value (step S5 in FIG. 3).

Incidentally, the degree of danger based on N may be decided on the basis of only the number of the generated optical flows acquired from the small region nearest to one's own vehicle.

[Warning to a Driver]

Finally, an explanation will be given of the warning to a driver in step S6 in FIG. 3.

The warning to the driver is carried out on the basis of the evaluation of the degree of danger in the processing in step S5. The arithmetic unit 23 in the environment monitoring system according to the present invention controls the warning device 24 in accordance with the degree of danger acquired in step S5 so that an alarm is sounded to call a driver's attention. In this way, this assists the limited recognition of a human being, thereby preventing a danger of a serious accident or the actual occurrence thereof.

In the above explanation, the monitoring region ahead of one's own vehicle was defined as one's own vehicle running region (lane). However, where there are a plurality of running lanes, by extending the monitoring region to the region (lane) other than one's own vehicle running region (lane), the other vehicles running on each region (lane) in each of the front, rear and diagonal-rear directions.

In this embodiment, although the monitoring the front direction was explained, it is needless to say that the present invention can be applied to the cases of monitoring the rear and diagonal-rear directions.

For example, when a driver of a vehicle running on one-side two lanes of e.g. a speed way intends to make a lane, if he changes the lane to another lane while he misses another vehicle which catches up with one's own vehicle on another lane at a higher speed than one's own vehicle from the diagonal-rear direction, there is strong possibility of a serious accident. In such a case, the present invention can prevent the serious accident from occurring.

Further, in step S5 in FIG. 3, the degree of danger can be evaluated for each of the prescribed small regions. The degree of danger for each of the small regions is supplied to the warning means (not shown) to alert a driver. It is of course that the processing in each step in FIG. 3 is carried out by the arithmetic unit 23.

What is claimed is:

1. An environment monitoring system for monitoring a relative relation between one's own vehicle and another surrounding vehicle comprising:

image pick-up means for picking up two early and later images which are located at a front, rear or diagonal-rear position from one's own vehicle at two early and later timings and on the basis of the images thus picked-up, detecting white lines of one's own vehicle lane on which one's own vehicle runs;

monitoring region setting means for setting a monitoring region in one's own vehicle lane or an adjacent lane on the basis of the white lines thus detected; and optical-flow detecting means for detecting an optical flow generated from another surrounding vehicle within the monitoring region, wherein said optical-flow detecting means comprises:

means for reverse-projection converting said early image on the basis of a predetermined optical arrangement of said image pick-up means onto an x-z plane in parallel to a road surface in a real space to acquire a road surface image;

means for computing a moving distance of one's own vehicle between the two timings on the basis of a time interval between said two timings and speed information of one's own vehicle;

means for parallel-shifting the road surface image by the moving distance thus computed;

means for projection-converting the road surface image after parallel-shifted to acquire an estimated image of the later image in timing;

means for acquiring a differential image between the later image and its estimated image to extract a feature point; and means for searching a corresponding point of the feature point extracted, thereby-detecting the optical flow.

2. An environment monitoring system according to claim 1, wherein said optical-flow detecting means further comprises:

means for, prior to projection-converting the road surface image, computing angles of the white lines in the vicinity of one's own vehicle formed together with a z-axis on said road surface image parallel-shifted to acquire an average angle thereof; and means for rotating said road surface by said average angle around an origin of said x-z coordinate.

3. An environment monitoring system according to claim 2, further comprising means for evaluating the degree of danger which decides dangerous when the average value 1 of the magnitudes of optical flows exceeds a prescribed value as regards the degree D of danger in a front, rear or diagonal-rear field of view expressed by $$D = l = (1/N) \times \sum_{i=1}^{N} li$$

(where li denotes the magnitude of the optical flow, and N denotes the number of generated optical flows).

4. An environment monitoring system according to claim 3, wherein said means for evaluating the degree of danger decides dangerous when the number N of said optical flows exceeds a prescribed value.

5. An environment monitoring system according to claim 1, further comprising means for evaluating the degree of danger which decides dangerous when the average value 1 of the magnitudes of optical flows exceeds a prescribed value as regards the degree D of danger in a front, rear or diagonal-rear field of view expressed by $$D = l = (1/N) \times \sum_{i=1}^{N} li$$

(where li denotes the magnitude of the optical flow, and N denotes the number of generated optical flows).

6. An environment monitoring system according to claim 3, wherein said means for evaluating the degree of danger decides dangerous when the number N of said optical flows exceeds a prescribed value.

7. A method for monitoring a relative relation between an own vehicle and another environmental vehicle comprising the steps of:

picking up two early and later images which are located at a front, rear and diagonal-rear position from an own vehicle at two early and later timings by an image pick-up means and on the basis of the images thus picked-up, detecting white lines of an own vehicle lane on which one's own vehicle runs;

setting a monitoring region in one's own vehicle lane or an adjacent lane on the basis of the white lines thus detected;

detecting an optical flow generated from another environmental vehicle within the monitoring region, wherein said step of detecting an optical flow comprises the steps of:

reverse-projection converting said early image on the basis of a predetermined optical arrangement of said image pick-up means onto an x-z plane in parallel to a road surface in a real space to acquire a road surface image;

computing a moving distance of one's own vehicle in the two timings on the basis of a time interval between said two timings and speed information of one's own vehicle;

parallel-shifting the road surface image by the moving distance thus computed;

projection-converting the road surface image after parallel-shifted to acquire an estimated image of the later image in timing;

acquiring a differential image between the later image and its estimated image to extract a feature point; and searching a corresponding point of the feature point extracted, thereby detecting the optical flow.

8. A method according to claim 7, wherein said step of detecting an optical-flow further comprises:

prior to projection-converting the road surface image, computing angles of the white lines in the vicinity of one's own vehicle formed together with a z-axis on said road surface image parallel-shifted to acquire an average angle thereof; and rotating said road surface by said average angle around an origin of said x-z coordinate.

* * * * *